(12) United States Patent
Fukuda et al.

(10) Patent No.: US 9,920,243 B2
(45) Date of Patent: Mar. 20, 2018

(54) SCINTILLATOR, RADIATION DETECTOR, AND METHOD FOR DETECTING RADIATION

(75) Inventors: Kentaro Fukuda, Shunan (JP); Noriaki Kawaguchi, Shunan (JP); Akira Yoshikawa, Sendai (JP); Takayuki Yanagida, Sendai (JP); Yui Yokota, Sendai (JP)

(73) Assignees: TOKUYAMA CORPORATION, Shunan-Shi (JP); TOHOKU UNIVERSITY, Sendai-Shi (JP)

( * ) Notice: Subject to any disclaimer, the term of this patent is extended or adjusted under 35 U.S.C. 154(b) by 253 days.

(21) Appl. No.: 14/009,047

(22) PCT Filed: Apr. 2, 2012

(86) PCT No.: PCT/JP2012/058969
§ 371 (c)(1),
(2), (4) Date: Sep. 30, 2013

(87) PCT Pub. No.: WO2012/137738
PCT Pub. Date: Oct. 11, 2012

(65) Prior Publication Data
US 2014/0021355 A1 Jan. 23, 2014

(30) Foreign Application Priority Data

Apr. 4, 2011 (JP) ................. 2011-082995
Jun. 24, 2011 (JP) ................. 2011-140294

(51) Int. Cl.
*G01T 1/20* (2006.01)
*C09K 11/77* (2006.01)
(Continued)

(52) U.S. Cl.
CPC ........ *C09K 11/7733* (2013.01); *C09K 11/772* (2013.01); *C09K 11/7732* (2013.01);
(Continued)

(58) Field of Classification Search
CPC ..... G01T 3/06; G01T 1/2023; C09K 11/7733; C09K 11/7732; C09K 11/772;
(Continued)

(56) References Cited

U.S. PATENT DOCUMENTS 5,539,225 A 7/1996 Loomis et al.
8,044,367 B2 * 10/2011 Yoshikawa .......... C09K 11/645
250/390.11
(Continued)

FOREIGN PATENT DOCUMENTS

EP 2 636 773 A1 9/2013
WO WO 2004/086089 A1 10/2004
(Continued)

OTHER PUBLICATIONS

Author:S. Neicheva et al., Title: Energy transfer features in Eu2+ and Ce3+ doped LiCaAlF6 crystals, Date:Feb. 1, 2007, Publisher-:Radiation Measurements.*
(Continued)

*Primary Examiner* — David J Makiya
*Assistant Examiner* — Taeho Jo
(74) *Attorney, Agent, or Firm* — Birch, Stewart, Kolasch & Birch, LLP (57) ABSTRACT

The present invention aims at providing a scintillator for high temperature environments which has satisfactory light emission characteristics under high temperature environments; and a method for measuring radiation under high temperature environments. The scintillator for high temperature environments comprises a colquiriite-type crystal represented by the chemical formula $LiM^1M^2X_6$ (where $M^1$ is at least one alkaline earth metal element selected from Mg, Ca, Sr and Ba, $M^2$ is at least one metal element selected from Al, Ga and Sc, and X is at least one halogen element selected from F, Cl, Br and I), for example, typified by $LiCaAlF_6$, and
(Continued)

the crystal optionally containing a lanthanoid element such as Ce or Eu. The method for measuring radiation under high temperature environments uses the scintillator.

6 Claims, 7 Drawing Sheets

(51) Int. Cl.
  *G21K 4/00* (2006.01)
  *G01T 1/202* (2006.01)
  *G01T 3/06* (2006.01)
(52) U.S. Cl.
  CPC .............. *G01T 1/2023* (2013.01); *G01T 3/06* (2013.01); *G21K 4/00* (2013.01)
(58) Field of Classification Search
  CPC ............ C09K 11/7721; C09K 11/7734; C09K 11/613; G21K 4/00
  USPC .... 250/362, 370.01–370.15, 390.01–390.12, 250/361 C, 361 R
  See application file for complete search history.

(56) References Cited

U.S. PATENT DOCUMENTS

| | | | |
|---|---|---|---|
| 2006/0033025 A1 | 2/2006 | Ichinose et al. | |
| 2010/0314550 A1* | 12/2010 | Yoshikawa | C09K 11/645 250/390.11 |

FOREIGN PATENT DOCUMENTS

| | | |
|---|---|---|
| WO | WO 2009/119378 A1 | 10/2004 |
| WO | WO 2011/115179 A1 | 9/2011 |

OTHER PUBLICATIONS

Title: High-temperature study of colquiriite laser hosts, Author: Andrzej Grzechnik et al., Date: Mar. 8, 2004, Publisher: ESRF.*
Title: Anisotropic thermal expansion in LiCaAlF6 and LiSrAlF6, Author: Andrzej Grzechnik et al., Date: Jul. 30, 2004, Publisher: IOP Publishing Ltd.*
Author:S I Omelkov et al., Title: Luminescence properties of undoped LiBaAlF6 single crystals, Date: Jul. 2, 2010, Publisher: IOP Publishing.*
Author:Andrzej Grzechnik et al., Title: Anisotropic thermal expansion in LiCaAlF6 and LiSrAlF6, Date: Jul. 30, 2004, Publisher: Institute of Physics Publishing.*
Ahmed, "Physics and Engineering of Radiation Detection", 2007, pp. 312-313 and pp. 350-353.
International Search Report issued in PCT/JP2012/058969, dated Apr. 24, 2012.
Melcher, "Scintillators for Well Logging Applications", Nuclear Instruments and Methods in Physics Research, vol. B40-41, 1989, pp. 1214-1218.
Daniela Di Martino et al.; Rare earth doped LiCaAlF6 as a new potentional dosimetric material; Optical Materials; vol. 30, No. 1; Jul. 24, 2007; pp. 69-71.
Extended European Search Report dated Sep. 22, 2014, issued in corresponding European Patent Application No. 12768181.5.

* cited by examiner

A: Neutrons
B: Temperature controller
C: Power supply
D: Signal readout circuit

SCINTILLATOR, RADIATION DETECTOR, AND METHOD FOR DETECTING RADIATION

TECHNICAL FIELD

This invention relates to a scintillator for use in a radiation detector. More specifically, the invention relates to a scintillator comprising a colquiriite-type crystal and used under high temperature environments; a radiation detector for high temperature environments; and a method for detecting radiation at high temperatures.

BACKGROUND ART

Scintillators are substances which, when hit by radiation such as alpha rays, beta rays, gamma rays, X-rays, or neutrons, absorb the radiation to emit fluorescence. The scintillator is combined with a photodetector, such as a photomultiplier tube, and such a combination is used as a radiation detector.

The radiation detector is widely utilized in diverse application fields, including resource exploration fields such as well logging of oil fields, medical fields such as tomography, industrial fields such as nondestructive inspection, security fields such as inspection of personal belongings, and academic fields such as high energy physics.

The radiation detector used for well logging of oil fields is installed within an excavating drill, and is used to detect gamma rays or neutrons under excavation and predict the properties of strata (Patent Document 1). Since the temperatures fluctuate greatly during use under excavation, scintillators used for well logging of oil fields are required to have satisfactory characteristics in a wide range of temperatures of lower than 0° C. to higher than 200° C. (see Non-Patent Document 1)

As shown in FIG. 1 of the Non-Patent Document 1, however, the scintillators generally posed the problem of decreasing in the light yield under high temperature environments. For example, the light yield at about 110° C. from bismuth germanium oxide (BGO) decreases to about 16% as compared with the light yield at room temperature. Similarly, the light yield from cadmium tungsten oxide ($CdWO_4$) is reduced to about 20% at about 150° C. Even thallium-doped sodium iodide (Tl:NaI) and cesium fluoride (CsF), which are considered to have relatively satisfactory light emission characteristics under high temperature environments, were problematical in that their light yield decreased to about 70% and about 61%, respectively, under a high temperature environment at about 140° C.

PRIOR ART DOCUMENTS

Patent Documents

Patent Document 1: U.S. Pat. No. 5,539,225

Non-Patent Documents

Non-Patent Document 1: C. L. Melcher, "SCINTILLATORS FOR WELL LOGGING APPLICATIONS", Nuclear Instruments and Methods in Physics Research B 40/41 (1989) 1214-1218.

SUMMARY OF THE INVENTION

Problems to be Solved by the Invention

The present invention has been accomplished in the light of the above-mentioned problems. It is an object of the present invention to provide a scintillator for high temperature environments which is satisfactory in the light yield under high temperature environments; a radiation detector for high temperature environments; and a method for measuring radiation under high temperature environments with the use of the detector.

Means for Solving the Problems

The present inventors prepared various scintillators, and evaluated their light yield at high temperatures. As a result, they have found that a scintillator comprising a colquiriite-type crystal having a specific chemical composition shows a satisfactory light yield at a high temperature. This finding has led them to accomplish the present invention.

According to the present invention, there is provided a scintillator for high temperature environments, the scintillator comprising a colquiriite-type crystal represented by the following chemical formula where $M^1$ represents at least one alkaline earth metal element selected from the group consisting of Mg, Ca, Sr and Ba, $M^2$ represents at least one metal element selected from the group consisting of Al, Ga and Sc, and X represents at least one halogen element selected from the group consisting of F, Cl, Br and I.

In the above scintillator for high temperature environments, it is preferred that 1) the colquiriite-type crystal is represented by the chemical formula $LiCaAlF_6$;

2) the colquiriite-type crystal contains at least one lanthanoid element selected from the group consisting of Ce, Pr, Nd, Sm, Eu, Gd, Tb, Dy, Ho, Er, Tm and Yb;

3) the lanthanoid element is Ce or Eu; and 4) the isotopic ratio of $^6Li$ is 20% or more, and the scintillator is used for the detection of neutrons.

According to the present invention, there is also provided a radiation detector for high temperature environments which comprises the above scintillator for high temperature environments and a photodetector.

According to the present invention, there is further provided a method for detecting radiation, which comprises entering radiation, at a high temperature, into the scintillator for high temperature environments to emit fluorescence, and detecting the fluorescence by a detector. In the method for detecting radiation, it is preferred that the radiation be neutrons.

Effects of the Invention

The scintillator of the present invention can be used for a radiation detector for detecting X rays, gamma rays, or neutrons. Compared with conventional scintillators, the scintillator of the present invention minimally declines in the light yield, or rather increases in the light yield, even at 100° C. or higher, or even at a high temperature of 200° C. Thus, the scintillator of the present invention can be used as a scintillator particularly preferred for a radiation detector used under high temperature environments such as well logging of oil fields.

MODE FOR CARRYING OUT THE INVENTION

The scintillator for high temperature environments according to the present invention comprises a colquiriite-type crystal represented by the following chemical formula $$LiM^1M^2X_6$$

where $M^1$ represents at least one alkaline earth metal element selected from Mg, Ca, Sr and Ba, $M^2$ represents at least one metal element selected from Al, Ga and Sc, and X represents at least one halogen element selected from F, Cl, Br and I (may hereinafter be referred to simply as "colquiriite-type crystal"). The colquiriite-type crystal is a hexagonal crystal belonging to the space group P31c, and can be easily identified by the technique of powder X-ray diffraction.

The term "colquiriite" refers to a naturally occurring $LiCaAlF_6$ compound, which has a characteristic crystal structure. The colquiriite-type, as referred to herein, embraces a compound having a crystal structure similar to that of colquiriite in which some elements of the compound have been substituted by other elements.

The scintillator comprising the colquiriite-type crystal mentioned above decreases only slightly in the light yield under high temperature environments. Thus, it can be used particularly preferably as a scintillator for high temperature environments, for example, in a radiation detector used under high temperature environments such as well logging of oil fields.

In the present invention, the high temperature environments refer to environments in which the temperature of the scintillator reaches 100° C. or higher. In connection with the high temperature environments, the upper limit of the temperature is not limited, unless it exceeds the melting point of the scintillator. However, in order to suppress fluctuations in the light emission characteristics of the scintillator and fluctuations in the operating characteristics of a photodetector for detecting the light emission of the scintillator, the upper limit of the temperature is preferably set at 200° C. or lower. When the scintillator is used under an environment where the ambient temperature for the scintillator exceeds 200° C., it is preferred to provide a cooling mechanism for rendering the temperature of the scintillator 200° C. or lower.

In the scintillator of the present invention, the most preferred colquiriite-type crystal is a colquiriite-type crystal in which the halogen elements are F, because such a crystal lacks deliquescent properties and has excellent chemical stability. In the colquiriite-type crystal having F as the halogen elements, some of the F's may be substituted by Cl, Br or I in order to improve the properties of the scintillator, such as the light yield.

Of the colquiriite-type crystal having F as the halogen elements, moreover, the colquiriite-type crystal represented by the chemical formula $$LiCa_{1-x}Sr_xAlF_6 \text{ where } x \text{ denotes 0 to 1}$$

is preferred, because it facilitates the preparation of a large crystal, and can increase the light yield when used as a scintillator.

Furthermore, $LiCaAlF_6$ of the above-mentioned chemical formula where x is 0 is the most preferred as the scintillator for detection of neutrons. This is because the $LiCaAlF_6$ has a small effective atomic number, and can thus lower the sensitivity to γ rays which constitute a background noise in the detection of neutrons. In the present invention, the effective atomic number is an indicator defined by the following equation:

$$\text{Effective atomic number} = (\Sigma W_i Z_i^4)^{1/4}$$

where $W_i$ represent the mass fraction of the ith element among the elements constituting the scintillator, and $Z_i$ represent the atomic number of the ith element among the elements constituting the scintillator.

In the scintillator for high temperature environments according to the present invention, the colquiriite-type crystal preferably contains at least one lanthanoid element selected from the group consisting of Ce, Pr, Nd, Sm, Eu, Gd, Tb, Dy, Ho, Er, Tm and Yb.

The lanthanoid element acts as an activator for light emission upon incidence of radiation, and can increase the light yield from the scintillator. The scintillator comprising the colquiriite-type crystal containing any of the lanthanoid elements can be used preferably even under high temperature environments exceptionally exceeding 200° C.

Of the lanthanoid elements, Ce is one of the particularly preferred elements. By incorporating Ce into the colquiriite-type crystal, there can be obtained a scintillator with a particularly small decrease in the light yield under a high temperature environment. Since light emission ascribed to Ce has a short fluorescence lifetime, moreover, a scintillator with an excellent fast response can be obtained.

As will be described later, a scintillator comprising the colquiriite-type crystal represented, for example, by the chemical formula $LiCaAlF_6$ and containing Ce has the extremely rare feature that its light yield is larger under a high temperature environment in excess of 200° C. than under a normal temperature environment. Thus, the scintillator can be suitably used even under a high temperature environment exceeding 200° C.

Of the lanthanoid elements, Eu is also a particularly preferred element. By incorporating Eu into the colquiriite-type crystal, there can be obtained a scintillator minimally decreasing in the light yield under a high temperature environment, and obtaining a very large light yield.

For example, a scintillator comprising the colquiriite-type crystal represented by the chemical formula $LiCaAlF_6$ and containing Eu can maintain 50% of the light yield, which is obtained under a normal temperature environment, even under a high temperature environment at 300° C. Thus, the scintillator can be suitably used even under high temperature environments at 200° C. to 300° C.

The content of the lanthanoid element is preferably 0.01 to 0.5 mol % based on the colquiriite-type crystal. By setting the content at 0.01 mol % or more, the light yield from the scintillator can be increased. By setting the content at 0.5 mol % or less, problems in the production of the scintillator, such as cloudiness, can be avoided. The content of the lanthanoid element, as will be described later, can be adjusted, as appropriate, by the mixing ratio of a halide of the lanthanoid element to be added to a material mixture in the production of the scintillator.

The scintillator of the present invention is not limited in the radiation to be detected, and can be used to detect radiation such as X rays, alpha rays, beta rays, gamma rays, or neutrons. Since $^6Li$ isotope can be incorporated into the crystal, in particular, the scintillator exhibits its maximum effect in detecting neutrons among the radiations. That is, the $^6Li$ isotope is highly efficient in performing a neutron capture reaction, and can easily detect neutrons, which have been incident on the scintillator, by its neutron capture reaction. Thus, the colquiriite-type crystal containing the $^6Li$ isotope is particularly preferred as a neutron detection scintillator.

When the scintillator of the present invention is used as a neutron detection scintillator, the isotopic ratio of $^6Li$ is preferably 20% or more. The isotopic ratio of $^6Li$ refers to the abundance ratio of $^6Li$ isotope in all lithium elements, and affects the detection efficiency for neutrons. That is, neutrons incident on the scintillator are detected by causing a neutron capture reaction with the $^6Li$ isotope, as stated above. Thus, the higher the isotopic ratio of $^6Li$, the better the detection efficiency for neutrons becomes when the scintillator is used as a scintillator for neutron detection.

The isotopic ratio of $^6Li$ can be adjusted, as appropriate, by adjusting the isotopic ratio of $^6Li$ contained in a lithium halide (will hereinafter be referred to as LiX), such as LiF, used as a starting material.

With naturally occurring Li, the isotopic ratio of $^6Li$ is merely about 7.6%. However, materials in which $^6Li$ isotope is enriched to raise the isotopic ratio of $^6Li$ are commercially available, and can be easily procured. In the present invention, examples of the method for adjusting the isotopic ratio of $^6Li$ are a method using a material having the $^6Li$ isotope enriched to the intended isotopic ratio of $^6Li$, and a method which comprises making ready for use a material having $^6Li$ enriched beforehand to the intended $^6Li$-isotopic ratio or higher, and mixing the enriched material with a general-purpose material having the natural isotopic ratio to adjust the isotopic ratio.

In the present invention, the detection efficiency of the resulting colquiriite-type crystal for neutrons can be increased sufficiently by setting the isotopic ratio of $^6Li$ at 20% or more. In order to enhance the detection efficiency further, the isotopic ratio of $^6Li$ is set preferably at 50% or more, and most preferably at 90% or more.

In the present invention, the colquiriite-type crystal may be in any of a single crystal form and a polycrystalline form. However, a single crystal is preferred in order to obtain a scintillator with a high light yield, without involving a loss due to nonradiative transition attributed to a lattice defect or the dissipation of scintillation light at the grain boundary.

The scintillator comprising the single crystal is a colorless or slightly colored transparent crystal, and is highly transparent to scintillation light. This crystal also has satisfactory chemical stability and, when it is used in an ordinary manner, its performance does not deteriorate over a short term. Furthermore, its mechanical strength and processability are satisfactory, and it can be easily processed into a desired shape and used.

The method of producing the scintillator comprising the single crystal is not limited, and the crystal can be produced by a publicly known crystal manufacturing method. Preferably, the crystal is produced by the Czochralski method or the micro-pulling-down method. By adopting the Czochralski method or the micro-pulling-down method, a single crystal excellent in quality, such as transparency, can be produced. According to the micro-pulling-down method, the single crystal can be directly produced in a specific shape, and can be produced in a short time. According to the Czochralski method, on the other hand, a large single crystal several inches in diameter can be produced at a low cost.

An explanation will be offered for a general method for producing the scintillator comprising the colquiriite-type single crystal by the Czochralski method.

Figure 1:
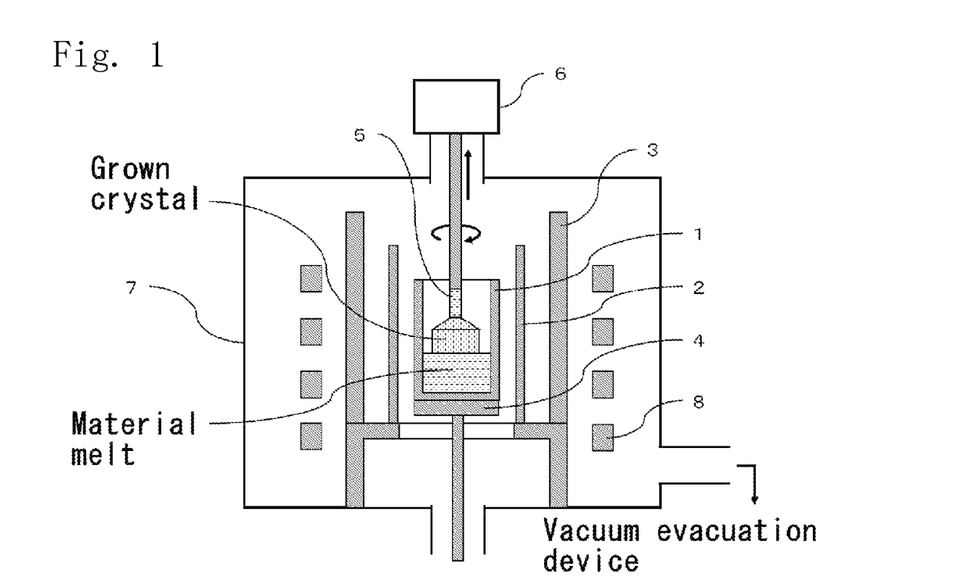
FIG. 1 is a schematic view of an apparatus for manufacturing a crystal, which is used for the scintillator of the present invention, by the Czochralski method.

First, predetermined amounts of materials are charged into a crucible 1. The purity of the materials is not limited, but is preferably 99.99% or higher. By using such high-purity materials, the purity of the resulting crystal can be increased, so that the characteristics such as the light yield are improved. The materials used may be powdery or particulate materials, or may be used after being sintered or melt-solidified beforehand.

As the materials, according to the intended colquiriite-type crystal, there is used a material mixture formed by mixing, as appropriate, LiX, halides of the alkaline earth metals (for example, $MgF_2$, $CaF_2$, $SrF_2$ and $BaF_2$), halides of the metal elements (for example, $AlF_3$, $GaF_3$ and $ScF_3$), and halides of the lanthanoid elements (for example, $CeF_3$, $PrF_3$ and $NdF_3$).

The mixing ratio of LiX, the halide of the alkaline earth metal, and the halide of the metal element in the material mixture is adjusted to a molar ratio of 1:1:1. In producing the colquiriite-type crystal by the melt growth method such as the Czochralski method or the micro-pulling-down method, however, the LiX and the halide of the metal element may each be used about 1 to 10% in excess of the above ratio, because they volatilize easily. Their volatilization volumes are entirely different according to the manufacturing conditions (temperature, atmosphere, process, etc.) for the crystal. Thus, it is desirable to investigate the volatilization volumes of the LiX and the halide of the metal element beforehand, and determine the mixing ratio of the materials.

The amount of the lanthanoid element incorporated in the colquiriite-type crystal can be adjusted optionally by the mixing ratio of the halide of the lanthanoid element added to the material mixture. This mixing ratio is preferably set at 0.1 to 5 mol % with respect to the colquiriite-type crystal. By setting the mixing ratio at 0.1 mol % or more, the light yield can be increased. By setting the mixing ratio at 5 mol % or less, the problem such as the cloudiness of the single crystal can be avoided.

Then, the crucible 1 charged with the materials, a heater 2, a heat insulator 3, and a movable stage 4 are installed as shown in FIG. 1. Another crucible with a hole provided at the bottom may be mounted above the crucible 1 and suspended by being fixed to the heater 2 or the like, whereby a double crucible structure may be constructed.

A seed crystal 5 is mounted on the front end of an automatic diameter control device 6. A metal, such as platinum, excellent in corrosion resistance at a high temperature may be used instead of the seed crystal. However, the use of a single crystal having a crystal structure identical to or similar to that of the colquiriite-type crystal to be produced is preferred, because polycrystallization or the cracking of the crystal can be avoided.

The automatic diameter control device is composed of a load cell for measuring the weight of the crystal, and a circuit system for feeding the measured weight back to a heater output. By using this automatic diameter control device, a crystal with the intended diameter can be produced stably with high accuracy.

Then, using a vacuum evacuator, the interior of a chamber 7 is evacuated to $1.0 \times 10^{-3}$ Pa or lower. Then, an inert gas such as high purity argon is introduced into the chamber for gas exchange. The pressure within the chamber after the gas exchange is not limited, but is generally atmospheric pressure. By this gas exchange operation, water adhering to the starting materials or the interior of the chamber can be removed, and the deterioration of the crystal due to such water can be prevented.

To avoid adverse influence due to water which cannot be removed even by the above gas exchange operation, it is preferred to use a scavenger highly reactive with water. As such a scavenger, tetrafluoromethane or the like can be used preferably. The scavenger is mixed with the above-mentioned inert gas, and the mixture is introduced into the chamber.

After the gas exchange operation is performed, the materials are heated by a high frequency coil 8 and the heater 2 until they are melted. The method of heating is not limited, and a resistance heating method using a carbon heater or the like, for example, can be used, as appropriate, in place of the induction heating method using the high frequency coil and the heater.

Then, the molten material melt is brought into contact with the seed crystal. The output of the heater is adjusted such that a portion of the melt in contact with the seed crystal is brought to a solidification temperature. Then, under control by the automatic diameter control device 6, the resulting crystal is pulled upward, with the pull rate being automatically adjusted. The movable stage 4 may be moved upward or downward, as appropriate, in order to adjust the liquid level. The crystal is continuously pulled up, with the output of the high frequency coil being adjusted where appropriate. When the crystal grows to the desired length, the crystal is cut off the liquid surface, and cooled over the course of a sufficient time so as to avoid cracking of the crystal. As a result, a single crystal can be obtained.

Annealing may be performed for the produced crystal, for the purpose of eliminating a crystal defect due to a deficiency in the fluorine atoms or thermal strain.

The resulting single crystal has satisfactory processability, and can be processed into a desired shape for use as a scintillator. In processing the crystal, a cutter such as a blade saw or a wire saw, a grinder or an abrasive wheel, which is publicly known, can be used without limitation.

The shape of the scintillator according to the present invention is not limited. Preferably, however, this scintillator has an optical output surface opposing a photodetector to be described later, and the optical output surface has been optically polished. By having such an optical output surface, the scintillator can enter light generated thereby into the photodetector efficiently.

The shape of the optical output surface is not limited, and a shape adapted for applications, such as a quadrilateral shape measuring several millimeters to several hundred millimeters per side, or a circular shape with a diameter of several millimeters to several hundred millimeters, can be appropriately selected and used. The thickness of the scintillator in the direction of incidence of radiation differs according to the radiation to be detected, but is generally several hundred micrometers to several hundred millimeters.

Preferably, a light reflection film comprising aluminum or Teflon (registered trademark) is applied to a surface of the scintillator which does not oppose the photodetector. By so doing, dissipation of light generated by the scintillator can be prevented.

The scintillator of the present invention is combined with a photodetector, whereby a radiation detector for high temperature environments can be constituted. That is, light emitted from the scintillator upon irradiation with radiation is converted into an electrical signal by the photodetector, whereby the presence or absence and strength of the radiation can be grasped as the electrical signal.

The type of the photodetector is not limited, but it is preferred to use a photomultiplier tube for high temperature environments which is excellent in characteristics under high temperature environments. Examples of such a photomultiplier tube for high temperature environments are R4177 Series, R3991A Series, R1288A Series, R1288AH Series, R6877A Series, R9722A Series, R4607 Series, and R5473 Series produced by HAMAMATSU PHOTONICS K.K.

As another embodiment of the radiation detector for high temperature environments according to the present invention, there is named an embodiment in which the scintillator is installed under a high temperature environment, a photodetector is installed at a position spaced from the scintillator, and a light guide optically connects the scintillator and the photodetector. According to this embodiment, only the scintillator can be installed under the high temperature environment, while the photodetector can be installed under a low temperature environment. Thus, there is no need to use the aforementioned photomultiplier tube for high temperature environments, and a photodetector in general use can be selected and used without limitation. Moreover, the above embodiment enables an installation space for the photodetector to be remote from a measuring unit, so that the embodiment can be adopted particularly preferably for measurement in a narrow space.

Any material can be used as the light guide without limitation, as long as it can transmit light emitted from the scintillator to the photodetector. Preferably, however, an optical fiber is used in consideration of the transmission efficiency of light and the degree of freedom of installation.

The method of manufacturing a radiation detector for high temperature environments according to the present invention is not limited. For example, the scintillator is installed, with its optical output surface in close proximity to an optical detection surface of the photodetector, and a power supply and a signal readout circuit are connected to the photodetector, whereby a radiation detector can be produced. The signal readout circuit is generally composed of a preamplifier, a shaping amplifier, a multichannel pulse height analyzer, and an oscilloscope.

In the embodiment using the light guide, the optical output surface of the scintillator is brought into close proximity to one end surface of the light guide, the optical detection surface of the photodetector is brought into close proximity to the other end surface of the light guide, and a power supply and a signal readout circuit are connected to the photodetector, whereby a radiation detector can be produced.

Uses of the radiation detector for high temperature environments are not limited, but this radiation detector can be preferably used as a radiation detector for well logging of oil fields which is used under high temperature environments.

Furthermore, a multiplicity of the scintillators each coated with the aforementioned light reflection film are arrayed, and position-sensitive photodetectors are used as the photodetectors, whereby position resolution can be imparted to the radiation detector.

EXAMPLES

Hereinbelow, the present invention will be described concretely by reference to its Examples, but the present invention is in no way limited by these Examples. Moreover, not all of combinations of the features described in the Examples are essential to the means for solution to the problems that the present invention adopts.

Example 1

[Production of Scintillator]

A colquiriite-type crystal represented by the chemical formula $LiCaAlF_6$ and containing Ce as a lanthanoid element was produced in the manner described below using a crystal production apparatus by the Czochralski method shown in FIG. 1. The isotopic ratio of $^6Li$ was set at 95%.

High purity fluoride powders of LiF, $CaF_2$, $AlF_3$ and $CeF_3$, each having purity of 99.99% or higher, were used as raw materials. As the LiF, a commercially available product with a $^6Li$-isotopic ratio of 95% was used. The crucible 1, the heater 2, and the heat insulator 3 used were formed of high purity carbon.

First, LiF, $CaF_2$, $AlF_3$ and $CeF_3$ were weighed such that their mixing ratio (molar ratio) was 1.01:1:1.03:0.02, and they were mixed thoroughly to prepare a material mixture. The total weight of the resulting material mixture was 3 kg. The material mixture was charged into the crucible 1, and the charged crucible 1 was installed on the movable stage 4, whereafter the heater 2 and the heat insulator 3 were sequentially installed around the crucible 1. Then, a $LiCaAlF_6$ single crystal, which had been processed into the form of a rectangular parallelepiped measuring 6×6×30 mm³, was used as the seed crystal 5, and mounted on the front end of the automatic diameter control device.

The interior of the chamber 6 was evacuated under vacuum to $5.0×10^{-4}$ Pa by use of a vacuum evacuation device composed of an oil-sealed rotary vacuum pump and an oil diffusion pump. Then, a tetrafluoromethane-argon mixed gas was introduced into the chamber 7 up to atmospheric pressure for gas exchange.

A high frequency current was applied to the high frequency coil 8 to heat the materials by induction heating, thereby melting them. The seed crystal 5 was moved until a 6×6 mm² surface of the seed crystal 5 was brought into contact with the liquid surface of the material melt. The output of the heater was adjusted such that a portion of the melt in contact with the seed crystal came to a solidification temperature. Then, under control by the automatic diameter control device 6, the diameter of the resulting crystal was gradually increased up to 55 mm, whereafter the crystal was pulled upward, with its diameter being kept at a constant value of 55 mm.

During the process of pulling up the crystal, the movable stage 4 was raised such that the liquid level remained at a constant height, and the crystal was continuously pulled up, with the output of the high frequency coil being adjusted so that the diameter of the crystal was constant. When the crystal grew to a length of about 80 mm, the crystal was cut off the liquid surface, and cooled over about 48 hours to obtain a single crystal with a diameter of 55 mm and a length of about 80 mm.

A part of the single crystal was pulverized, and the resulting powder was subjected to X-ray diffraction measurement. The single crystal was found to be a $LiCaAlF_6$ single crystal, one of colquiriite-type crystals.

Separately, using a powder obtained by pulverizing a part of the single crystal, a solution was prepared by the alkali fusion method, and the solution was subjected to inductively coupled plasma-mass spectrometry to measure the content of Ce. The content of Ce was found to be 0.04 mol % based on the colquiriite-type crystal.

Based on these findings, the single crystal produced in the present Example was a colquiriite-type crystal represented by the chemical formula $LiCaAlF_6$, containing 0.04 mol % of Ce, and having an isotopic ratio of $^6Li$ of 95%.

The resulting colquiriite-type crystal was cut by a wire saw equipped with a diamond wire. Then, all surfaces of the crystal were ground with an abrasive wheel and optically polished to be processed into a shape measuring 10 mm×6 mm×0.5 mm. In this manner, the scintillator of the present invention was obtained.

[Evaluation of Light Emission Characteristics Under Various Temperature Environments: Irradiation with Hard X-Rays]

In connection with the resulting scintillator, the light emission characteristics upon irradiation with hard X-rays were measured by the following method:

First, the scintillator was installed inside a device for measuring an emission spectrum. A heater and a thermocouple for measuring the temperature of the scintillator were installed in close contact with the scintillator.

Figure 2:
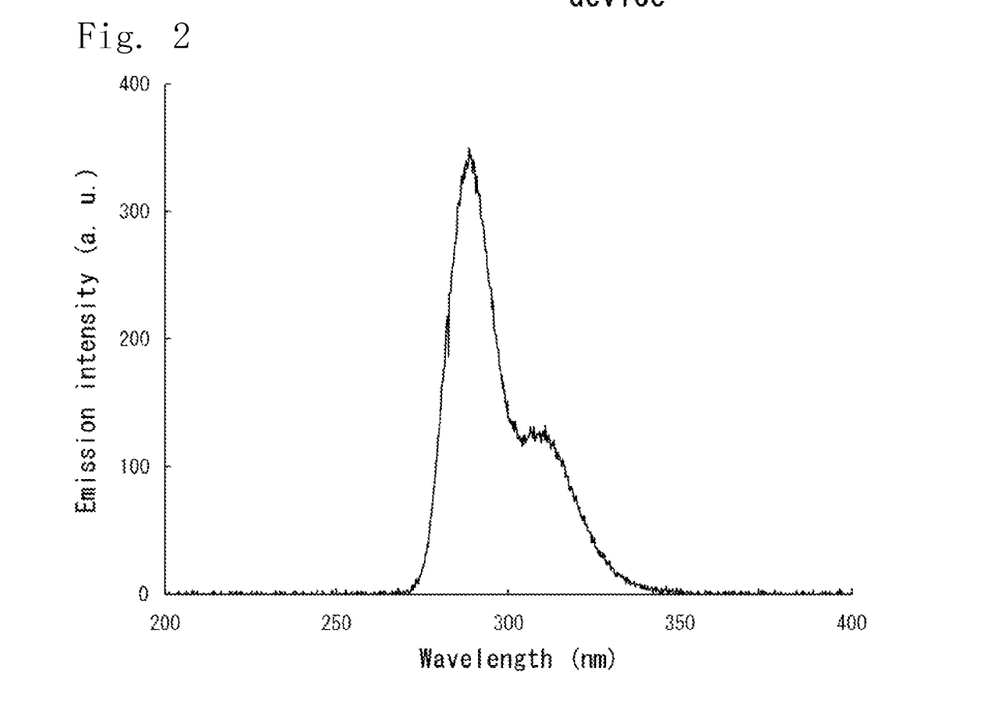
FIG. 2 is a view showing an emission spectrum obtained when the scintillator of Example 1 was irradiated with hard X-rays.

Then, using a sealed X-ray tube (A-41L-W produced by Toshiba Electron Tubes and Devices Co., Ltd.) having tungsten as a target, the scintillator was irradiated with hard X-rays. The tube voltage and the tube current when generating hard X-rays from the sealed X-ray tube were 60 kV and 40 mA, respectively. Ultraviolet rays generated by the ultraviolet output surface of the scintillator were collected by a light collecting mirror, and monochromatized with a spectroscope (BUNKOUKEIKI Co., Ltd.). The emission intensities at various wavelengths in the range of 200 to 400 nm were recorded to obtain the spectrum of light emission generated by the scintillator. The emission spectrum obtained at room temperature is shown in FIG. 2.

The above measurements confirmed that the scintillator of the present Example exhibited light emission peaking at a wavelength of 289 nm upon irradiation with hard X-rays, and acts as a scintillator.

Figure 3:
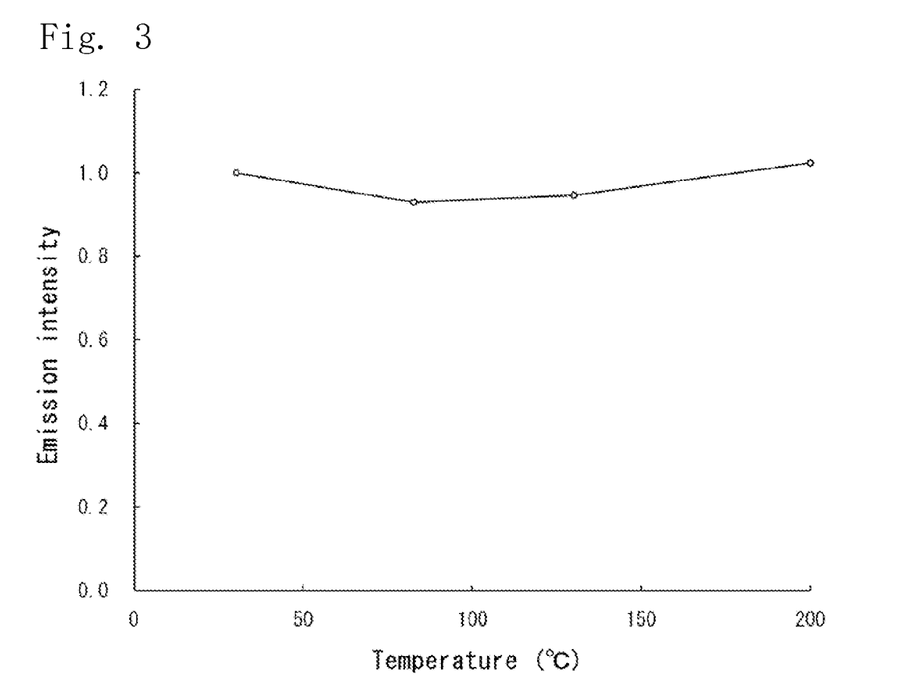
FIG. 3 is a view showing the light yield from the scintillator of Example 1 under various temperature environments.

Then, the scintillator was heated using the heater, and the emission intensities under different temperature environments at the scintillator temperatures of 30° C., 83° C., 130° C. and 200° C. were measured. The results are shown in FIG. 3. In FIG. 3, the ordinate represents the emission intensity at 289 nm, the peak wavelength of the emission spectrum, with the emission intensity at 30° C. being expressed as 1. FIG. 3 shows that the scintillator of the present Example did not decrease in the light yield even under a high temperature environment at 200° C., and it is effective as a scintillator for high temperature environments.

[Evaluation of Light Emission Characteristics Under Various Temperature Environments: Irradiation with Neutrons]

Figure 4:
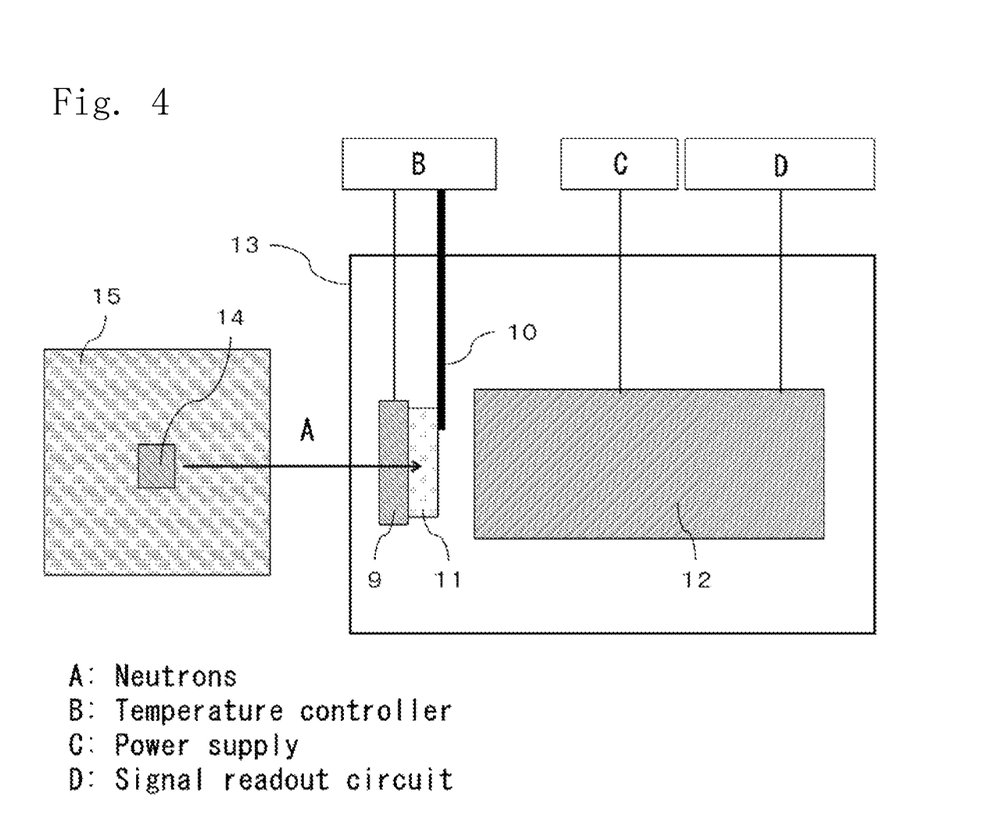
FIG. 4 is a view showing an experimental system used when obtaining pulse height spectra upon irradiation of a scintillator with neutrons under various temperature environments.

In connection with the resulting scintillator, the light emission characteristics upon irradiation with neutrons were measured by the following method:

First, as shown in FIG. 4, a heater 9 and a thermocouple 10 for measuring the temperature of a scintillator were installed in close contact with a scintillator 11, and a photomultiplier tube 12 (H6521 produced by HAMAMATSU PHOTONICS K.K.) as a photodetector was installed at a position opposing the optical output surface of the scintillator. The distance between the optical output surface of the scintillator and the optical detection surface of the photomultiplier tube was set at 10 mm.

A power supply and a signal readout circuit were connected to the photomultiplier tube. As the signal readout circuit, a shaping amplifier and a multichannel pulse height analyzer were connected from the photomultiplier tube side. The resulting neutron detector was covered with a black sheet 13 for light shielding so that light other than light from the scintillator would not enter the photomultiplier tube. Then, a high voltage of 1400V was applied to the photomultiplier tube with the use of the power supply connected to the photomultiplier tube.

The scintillator was irradiated with neutrons from a $^{252}Cf$ sealed radiation source with radioactivity of about 3.7 MBq after the neutrons were moderated by a polyethylene block 15 having a thickness of 100 mm. Emitted light pulses produced by the scintillator upon entry of the neutrons were converted into pulsed electrical signals by the photomultiplier tube. The electrical signals were entered into the multichannel pulse height analyzer via the shaping amplifier. The electrical signals entered into the multichannel pulse height analyzer were analyzed to prepare a pulse height spectrum.

Using the heater 9 and the thermocouple 10 connected to a temperature controller, the scintillator was heated to temperatures of 25° C., 100° C., 200° C. and 300° C., and the pulse height spectra were prepared under different temperature environments.

Figure 5:
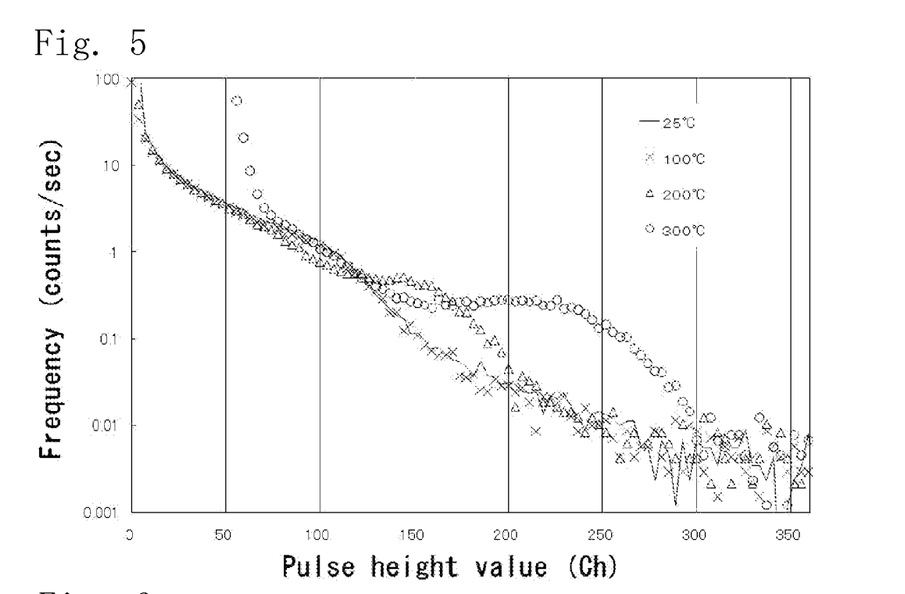
FIG. 5 is a view showing pulse height spectra obtained when the scintillator of Example 1 was irradiated with neutrons under various temperature environments.

The resulting pulse height spectra are shown in FIG. 5. The abscissa of the pulse height spectrum represents the pulse height value of the pulsed electrical signal, namely, the light yield from the scintillator. Here, the pulse height value was expressed as a relative value with respect to the pulse height value of the peak of the pulse height spectrum under the 25° C. normal temperature environment being taken as 100. The ordinate represents a frequency (counts/sec) with which the electrical signal showing each pulse height value was measured.

Peaks formed as a result of detection of neutrons were confirmed from FIG. 5, showing that the system of the present Example was successful in detecting neutrons under any of the temperature environments. Moreover, the scintillator of the present Example exhibited, under the high temperature environments at 200° C. and 300° C., the light yields of 155 and 230% of that under the normal temperature environment, thus proving to have the excellent feature of increasing in the light yield under high temperature environments.

Example 2

[Production of Scintillator]

A colquiriite-type crystal represented by the chemical formula $LiCaAlF_6$ and containing Eu as a lanthanoid element was produced. The isotopic ratio of $^6Li$ was set at 95%.

A single crystal was obtained in the same manner as in Example 1, except that the mixing ratio (molar ratio) of LiF, $CaF_2$, $AlF_3$ and $EuF_3$ was 1.01:1:1.03:0.02. In connection with the resulting single crystal, X-ray diffraction measurement and measurement by inductively coupled plasma-mass spectrometry were made in the same manner as in Example 1. The single crystal produced in the present Example was found to be a colquiriite-type crystal represented by the chemical formula $LiCaAlF_6$, containing 0.04 mol % of Eu, and having an isotopic ratio of $^6Li$ of 95%.

The resulting colquiriite-type crystal was processed into a shape measuring 10 mm×6 mm×0.5 mm in the same manner as in Example 1 to obtain the scintillator of the present invention.

[Evaluation of Light Emission Characteristics Under Various Temperature Environments: Irradiation with Hard X-Rays]

The light emission characteristics of the scintillator were measured in the same manner as in Example 1, except that the range of the wavelengths for measurement was set at 300 to 500 nm.

Figure 6:
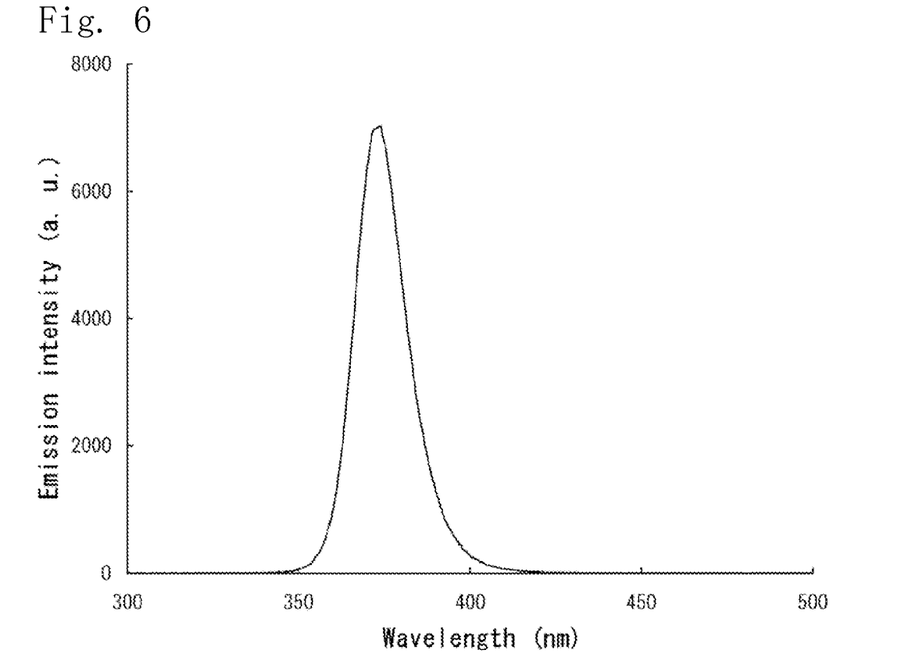
FIG. 6 is a view showing an emission spectrum obtained when the scintillator of Example 2 was irradiated with hard X-rays.

The emission spectrum obtained at room temperature is shown in FIG. 6. The scintillator of the present Example was confirmed to exhibit a very strong emission peaking at a wavelength of 374 nm upon irradiation with hard X-rays, and to act as a scintillator.

Figure 7:
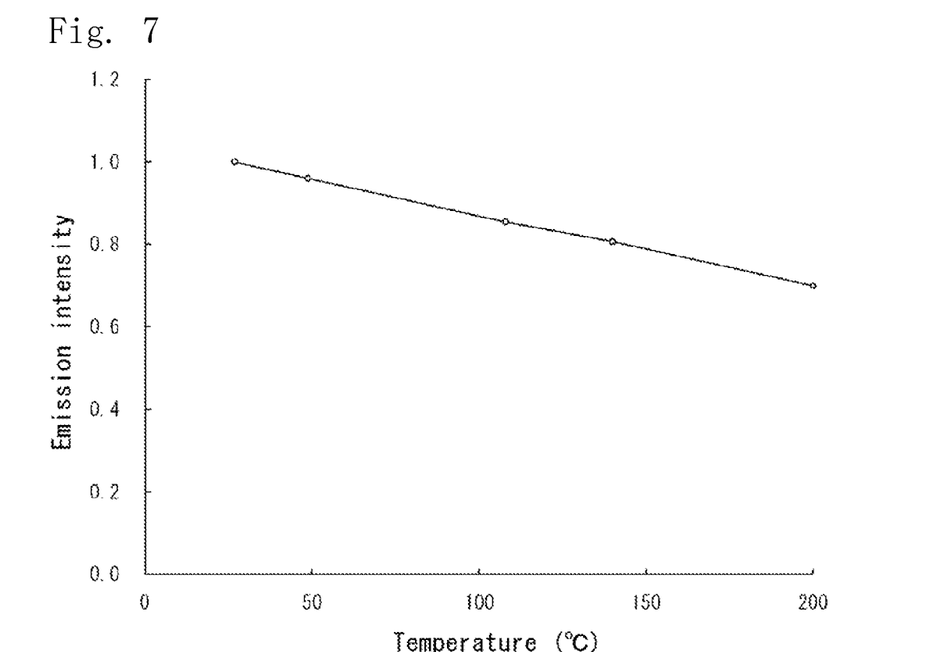
FIG. 7 is a view showing the light yield from the scintillator of Example 2 under various temperature environments.

Then, the scintillator was heated using the heater, and the emission intensities under different temperature environments at the scintillator temperatures of 27° C., 49° C., 108° C., 140° C. and 200° C. were measured. The results are shown in FIG. 7. In FIG. 7, the ordinate represents the emission intensity at 374 nm, the peak wavelength of the emission spectrum, with the emission intensity at 27° C. being expressed as 1. FIG. 7 shows that under high temperature environments at 140° C. and 200° C., the scintillator of the present Example maintained 81% and 70%, respectively, of the light yield obtained at 27° C., and it is effective as a scintillator for high temperature environments.

[Evaluation of Light Emission Characteristics Under Various Temperature Environments: Irradiation with Neutrons]

The light emission characteristics under various temperature environments upon irradiation with neutrons were measured in the same manner as in Example 1, except that a colquiriite-type crystal represented by the chemical formula $LiCaAlF_6$, containing 0.04 mol % of Eu, and having an isotopic ratio of $^6Li$ of 95% was used as the scintillator.

Figure 8:
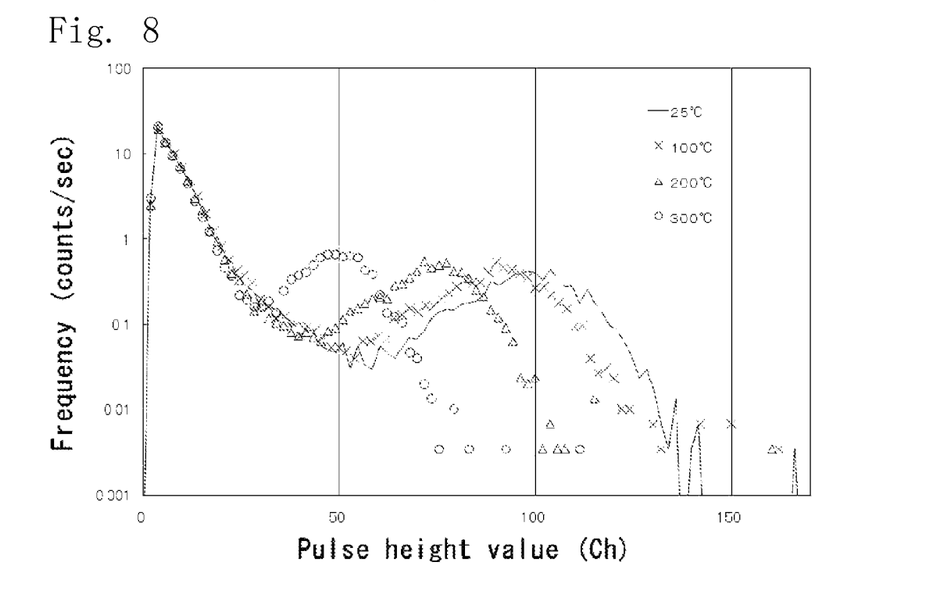
FIG. 8 is a view showing pulse height spectra obtained when the scintillator of Example 2 was irradiated with neutrons under various temperature environments.

The resulting pulse height spectra are shown in FIG. 8. The abscissa of the pulse height spectrum represents the pulse height value of the pulsed electrical signal, namely, the light yield from the scintillator. Here, the pulse height value was expressed as a relative value with respect to the pulse height value of the peak of the pulse height spectrum under a normal temperature environment at 25° C. being taken as 100. The ordinate represents a frequency (counts/sec) with which the electrical signal showing each pulse height value was measured.

Peaks formed as a result of detection of neutrons were confirmed from FIG. 8, showing that the system of the present Example was successful in detecting neutrons under any of the temperature environments. Moreover, the scintillator of the present Example exhibited, under high temperature environments at 200° C. and 300° C., the light yields of 75% and 50%, respectively, of that under the normal temperature environment, thus proving to involve very small decreases in the light yield under high temperature environments.

Comparative Example 1

[Production of Scintillator]

Commercially available Li glass (GS-20 produced by Saint-Gobain K.K.) was processed into a shape measuring 10 mm×6 mm×0.5 mm in the same manner as in Example 1 to obtain a scintillator.

[Evaluation of Light Emission Characteristics Under Various Temperature Environments: Irradiation with Hard X-Rays]

Figure 9:
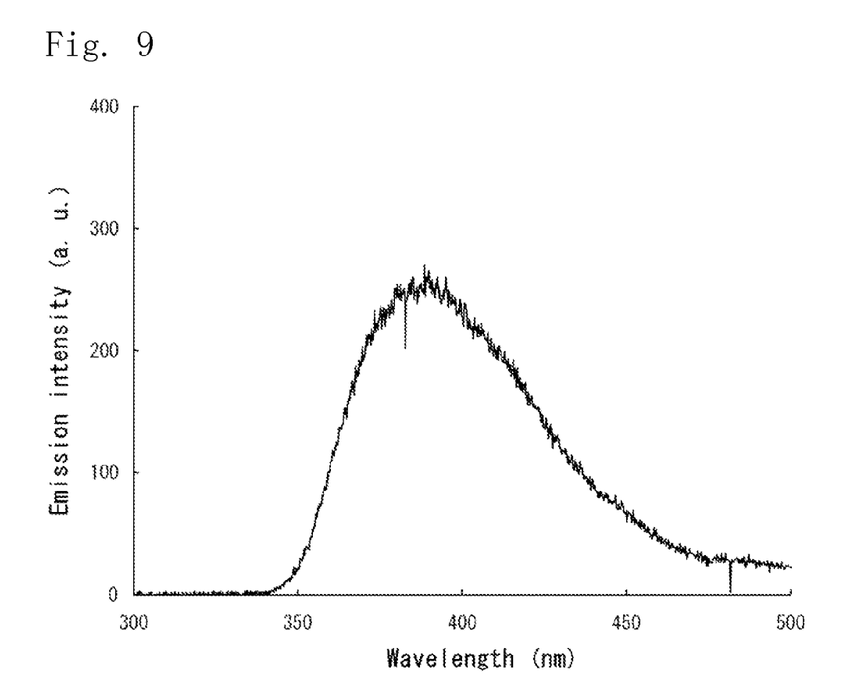
FIG. 9 is a view showing an emission spectrum obtained when the scintillator of Comparative Example 1 was irradiated with hard X-rays.

The light emission characteristics of the scintillator were measured in the same manner as in Example 1, except that the range of the wavelengths for measurement was set at 300 to 500 nm. The emission spectrum obtained at room temperature is shown in FIG. 9. The Li glass scintillator exhibited emissions peaking at a wavelength of 390 nm upon irradiation with hard X-rays.

Figure 10:
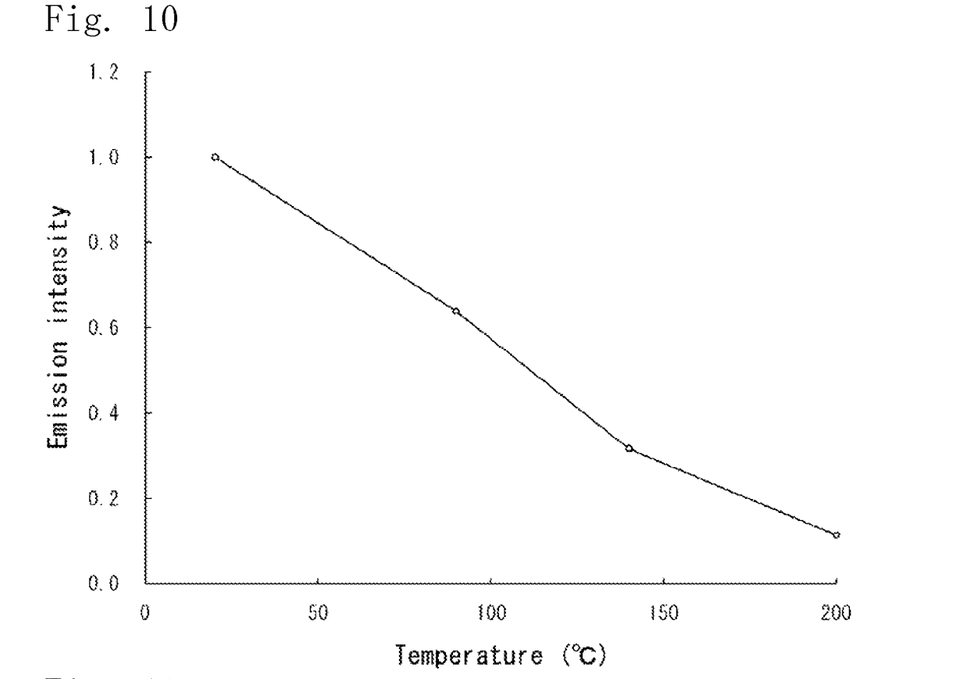
FIG. 10 is a view showing the light yield from the scintillator of Comparative Example 1 under various temperature environments.

Then, the scintillator was heated using the heater, and the emission intensities under different temperature environments at the scintillator temperatures of 20° C., 90° C., 140° C. and 200° C. were measured. The results are shown in FIG. 10. In FIG. 10, the ordinate represents the emission intensity at 390 nm, the peak wavelength of the emission spectrum, with the emission intensity at 20° C. being expressed as 1. FIG. 10 shows that with the publicly known Li glass scintillator used in the present Comparative Example, the light yields under high temperature environments at 140° C. and 200° C. decreased to 32% and 11%, respectively, of the light yield obtained at 20° C., and this scintillator is difficult to apply as a scintillator for high temperature environments.

[Evaluation of Light Emission Characteristics Under Various Temperature Environments: Irradiation with Neutrons]

The light emission characteristics under various temperature environments upon irradiation with neutrons were measured in the same manner as in Example 1, except that the above-mentioned Li glass was used as the scintillator.

Figure 11:
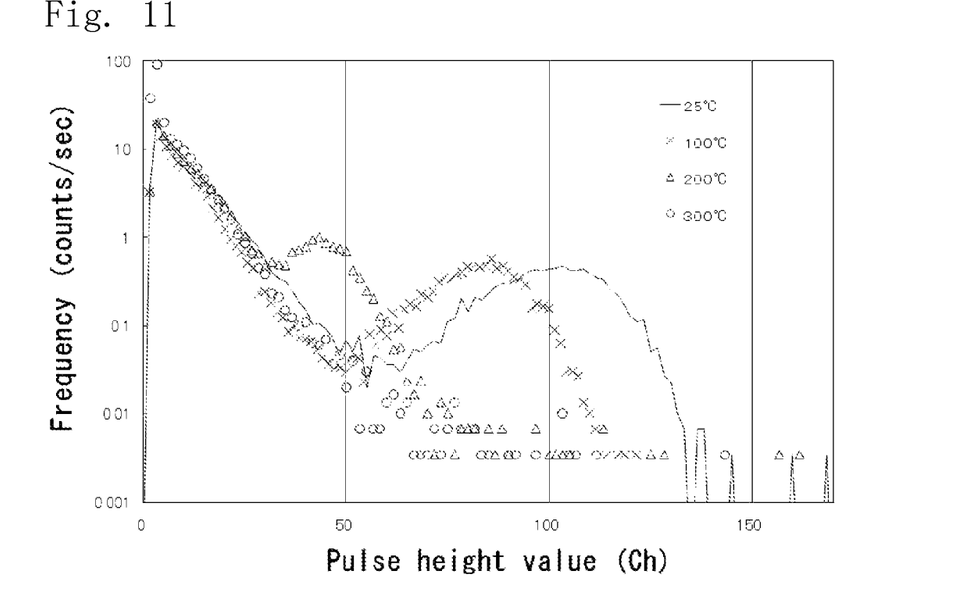
FIG. 11 is a view showing pulse height spectra obtained when the scintillator of Comparative Example 1 was irradiated with neutrons under various temperature environments.

The resulting pulse height spectra are shown in FIG. 11. The abscissa of the pulse height spectrum represents the pulse height value of the pulsed electrical signal, namely, the light yield from the scintillator. Here, the pulse height value was expressed as a relative value with respect to the pulse height value of the peak of the pulse height spectrum under a normal temperature environment at 25° C. being taken as 100. The ordinate represents a frequency (counts/sec) with which the electrical signal showing each pulse height value was measured.

FIG. 11 shows that peaks formed as a result of detection of neutrons under high temperature environments at 200° C. or lower were successfully confirmed, but that under a high temperature environment at 300° C., decreases in the light yield were marked, and peaks formed as a result of detection of neutrons failed to be confirmed. With the scintillator of the present Comparative Example, moreover, the light yield under the high temperature environment at 200° C. decreased to 40% of the light yield obtained under the normal temperature environment. This proves that the use of the Li glass scintillator under high temperature environments is difficult.

EXPLANATIONS OF LETTER OR NUMERALS

1 Crucible
2 Heater
3 Heat insulator
4 Movable stage
5 Seed crystal
6 Automatic diameter control device
7 Chamber
8 High frequency coil
9 Heater
10 Thermocouple
11 Scintillator
12 Photomultiplier tube
13 Black sheet
14 Cf sealed radiation source
15 Polyethylene block

The invention claimed is:

1. A method for detecting radiation by scintillation, comprising:
   entering radiation, at a high temperature of not lower than 100° C., into a scintillator, the scintillator comprising a colquiriite-type crystal represented by the following chemical formula:

$LiM^1M^2X_6$ wherein $M^1$ represents at least one alkaline earth metal element selected from the group consisting of magnesium (Mg), calcium (Ca), strontium (St) and barium (Ba), $M^2$ represents at least one metal element selected from the group consisting of aluminum (Al), gallium (Ga) and scandium (Sc), and X represents at least one halogen element selected from the group consisting of fluorine (F), chlorine (Cl), bromine (Br) and iodine (I), to emit fluorescence; and
   detecting the fluorescence by a photodetector.

2. The method for detecting radiation by scintillation according to claim 1, wherein the radiation is a ray of neutrons.

3. The method for detecting radiation by scintillation according to claim 1, wherein the colquiriite-type crystal is represented by the chemical formula $LiCaAlF_6$.

4. The method for detecting radiation by scintillation according to claim 1, wherein the colquiriite-type crystal contains at least one lanthanoid element selected from the group consisting of cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm) and ytterbium (Yb).

5. The method for detecting radiation by scintillation according to claim 4, wherein the lanthanoid element is Ce or Eu.

6. The method for detecting radiation by scintillation according to claim 1, wherein the scintillator has an isotopic ratio of $^6Li$ of 20% or more, and is used for detection of neutrons.

* * * * *